US009096247B2

(12) United States Patent
Witzel et al.

(10) Patent No.: US 9,096,247 B2
(45) Date of Patent: Aug. 4, 2015

(54) PORTABLE COOKING APPARATUS (71) Applicant: Onward Multi-Corp Inc., Waterloo (CA)

(72) Inventors: Theodore Andrew Witzel, Kitchener (CA); James Edward Scott, Cambridge (CA); Benjamin Michael Harrison, Waterloo (CA)

(73) Assignee: Onward Multi-Corp Inc., Waterloo, Ontario (CA)

( * ) Notice: Subject to any disclaimer, the term of this patent is extended or adjusted under 35 U.S.C. 154(b) by 86 days.

(21) Appl. No.: 13/833,660

(22) Filed: Mar. 15, 2013

(65) Prior Publication Data

US 2014/0265186 A1    Sep. 18, 2014

(51) Int. Cl.
*B62B 1/00* (2006.01)
*B62B 3/00* (2006.01)
*B62B 5/00* (2006.01)

(52) U.S. Cl.
CPC ............... *B62B 1/008* (2013.01); *B62B 5/0083* (2013.01); *B62B 2205/06* (2013.01)

(58) Field of Classification Search
USPC ........... 280/35, 645, 651, 652, 641, 638, 639, 280/43.1; 248/129, 439, 170, 166, 164, 248/431; 126/9 R, 9 B, 30, 39 B, 25 R, 29
See application file for complete search history.

(56) References Cited

U.S. PATENT DOCUMENTS

| | | | | |
|---|---|---|---|---|
| 2,484,239 A * | 10/1949 | Moon et al. | | 126/25 R |
| 4,210,118 A | 7/1980 | Davis et al. | | |
| 4,544,203 A * | 10/1985 | Younger et al. | | 297/391 |
| 4,705,247 A * | 11/1987 | Delmerico | | 248/98 |
| 5,318,322 A * | 6/1994 | Home | | 280/645 |
| 6,205,912 B1 * | 3/2001 | Chiu | | 99/339 |
| 6,257,229 B1 | 7/2001 | Stewart et al. | | |
| 6,422,230 B1 | 7/2002 | Stewart et al. | | |
| 6,439,221 B1 * | 8/2002 | Ward et al. | | 126/25 R |
| D480,907 S | 10/2003 | Pai | | |
| 6,863,063 B2 * | 3/2005 | Yeh | | 126/25 R |
| D516,860 S | 3/2006 | Nipke | | |
| 7,249,771 B1 * | 7/2007 | Brennan et al. | | 280/35 |
| 7,287,730 B1 * | 10/2007 | Chen | | 248/150 |
| 7,681,567 B2 * | 3/2010 | Chung | | 126/25 R |
| 7,828,377 B2 * | 11/2010 | Grace | | 297/42 |

(Continued)

OTHER PUBLICATIONS

All-Terrain Grill—Zippo Outdoor [online]. Published as early as Jul. 31, 2012 Retrieved from the Internet: <URL http://zippooutdoor.com/all-terrain-grill/.

(Continued)

*Primary Examiner* — James M Dolak
(74) *Attorney, Agent, or Firm* — Bereskin & Parr LLP (57) ABSTRACT

A portable cooking apparatus comprises a heating assembly, and a support assembly for supporting the heating assembly. The support assembly comprises first and second legs. Each leg comprises an upper segment and a lower segment. The legs are pivotably coupled to each other generally between the upper and lower segments. The upper segment of each leg is pivotably coupled to the heating assembly. The upper segment of at least one leg is slidably coupled to the heating assembly and slides when the support assembly moves between upright and folded positions. In the folded position, the upper and lower segments of the first leg are adjacent to the lower and upper segments of the second leg, respectively. In at least one of the legs, the upper and lower segments are laterally offset from one another.

19 Claims, 7 Drawing Sheets

(56) References Cited

U.S. PATENT DOCUMENTS

| | | |
|---|---|---|
| D636,628 S | 4/2011 | Chung |
| 7,958,882 B1 | 6/2011 | Sgourides |
| 8,201,550 B2 * | 6/2012 | Malumyan .................. 126/25 R |
| 8,316,837 B2 * | 11/2012 | Malumyan .................. 126/25 R |
| D680,365 S | 4/2013 | Chung |
| D680,366 S | 4/2013 | Chung |
| D687,667 S | 8/2013 | Chien et al. |
| 8,851,060 B2 * | 10/2014 | Johnson et al. ............... 126/9 B |
| 8,910,970 B2 * | 12/2014 | Chen ............................. 280/652 |
| 8,915,238 B2 * | 12/2014 | Goeken ......................... 126/9 R |
| 8,960,614 B2 * | 2/2015 | Chung ....................... 248/125.8 |
| 2005/0252504 A1 | 11/2005 | Cabrera et al. |
| 2013/0074822 A1 | 3/2013 | Chien et al. |

OTHER PUBLICATIONS

Coleman Canada [online]. Published as early as Aug. 20, 2012. Retrieved from the Internet: <URL http://colemancanada.ca/Catalog/GRILLS.RoadTrip.en.products.

* cited by examiner

PORTABLE COOKING APPARATUS

TECHNICAL FIELD

The present disclosure relates to portable barbecue grills or similar cooking devices having foldable or collapsible legs.

BACKGROUND

The following paragraphs are not an admission that anything discussed in them is prior art or part of the knowledge of persons skilled in the art.

U.S. Pat. No. 6,257,229 describes a foldable or collapsible cart for a barbecue grill and cart assembly which includes a frame assembly and first and second folding or collapsible leg assemblies. The leg assemblies are pivotally connected to the frame assembly at opposite ends thereof. The frame assembly mounts a barbecue grill casting.

U.S. Pat. No. 6,422,230 describes a foldable or collapsible stand for supporting a barbecue grill assembly. The foldable or collapsible stand includes a first leg assembly having a first pair of intersecting leg members pivotally mounted to each other and a second leg assembly having a second pair of intersecting leg members pivotally mounted to each other. At least one leg member of each of the first pair and second pair of intersecting leg members have a pivot point along a length of the at least one leg member for folding the at least one leg member. The first pair of intersecting leg members and second pair of intersecting leg members pivot with respect to each other and the at least one leg member of each of the first pair and second pair of intersecting leg members fold along the pivot point to move the first leg assembly, the second leg assembly and barbecue grill between an upright position and a collapsed position.

U.S. Pat. No. 7,958,882 describes a tub in a generally rectilinear configuration having a rear face, a front face and side faces. The tub has a closed bottom and an open top. The tub contains heating elements with controls in the front face. The controls are adapted to be manipulated by a user during operation and use. A lid in a generally rectilinear configuration has a posterior element and an anterior element. The posterior element has a rear face, an open front and side faces. The posterior element has an open bottom and a closed top. The anterior element has a front face, an open rear and side faces. The posterior element has an open bottom and a closed top. The rear of the anterior element is adapted to slidably couple with respect to the front of the posterior element. In this manner movement is provided between an expanded and contracted orientation.

INTRODUCTION

The following paragraphs are intended to introduce the reader to the more detailed description that follows and not to define or limit the claimed subject matter.

In an aspect of the present disclosure, there is a portable cooking apparatus, comprising a heating assembly, and a support assembly for supporting the heating assembly. The support assembly comprises at least one set of first and second legs. Each of the first and second legs comprises an upper segment and a lower segment. The first and second legs are pivotably coupled to each other generally between the upper and lower segments. The upper segment of each of the first and second legs is pivotably coupled to the heating assembly. The upper segment of at least one of the first and second legs is slidably coupled to the heating assembly and slides when the support assembly moves between upright and folded positions. In the folded position, the upper and lower segments of the first leg are adjacent to the lower and upper segments of the second leg, respectively. In at least one of the first and second legs, the upper and lower segments are laterally offset from one another.

In the folded position, the lower segment of the at least one of the first and second legs may be spaced apart from the heating assembly to accommodate the upper segment of the other one of the first and second legs.

In the at least one of the first and second legs, longitudinal axes of the upper and lower segments may be generally parallel.

The longitudinal axis of the upper segment may be spaced apart from the longitudinal axis of the lower segment by an offset distance. The offset distance may be at least as large as a width dimension of the upper segment of the other one of the first and second legs.

The longitudinal axis of the upper segment may be spaced apart from the longitudinal axis of the lower segment by an offset distance. The offset distance may be approximately equal to a width dimension of the upper segment of the other one of the first and second legs.

In each of the first and second legs, the upper and lower segments may be laterally offset from one another so that, in the folded position, each of the lower segments is spaced apart from the heating assembly to accommodate the upper segment of the other leg.

In each of the first and second legs, longitudinal axes of the upper and lower segments may be generally parallel.

In the first leg, the longitudinal axis of the upper segment may be spaced apart from the longitudinal axis of the lower segment by a first offset distance, and in the second leg, the longitudinal axis of the upper segment may be spaced apart from the longitudinal axis of the lower segment by a second offset distance. The first and second offset distances may be at least as large as width dimensions of the upper segments of the second and first legs, respectively.

In the first leg, the longitudinal axis of the upper segment may be spaced apart from the longitudinal axis of the lower segment by a first offset distance, and in the second leg, the longitudinal axis of the upper segment may be spaced apart from the longitudinal axis of the lower segment by a second offset distance. The first and second offset distances may be approximately equal to width dimensions of the upper segments of the second and first legs, respectively.

The first and second offset dimensions may be generally equal.

The heating assembly may comprise a frame. A top end of the upper segment of the first leg may be pivotably connected to the frame towards a first side thereof, and a top end of the upper segment of the second leg may be pivotably fixed to a block. The block may be slidably received in a channel of the frame.

The apparatus may further comprise a locking mechanism for fixing a location of the block relative to the channel when the support assembly is in at least one of the upright and folded positions.

The first and second legs may intersect at a pivot connector arranged between the upper and lower segments of each of the first and second legs. The pivot connector may comprise a first portion connecting a bottom end of the upper segment of the first leg with a top end of the lower segment of the first leg, and a second portion connecting a bottom end of the upper segment of the second leg with a top end of the lower segment of the second leg. The first and second portions may be adapted to rotate relative to one another about a pivot axis.

The pivot connector may comprise a biasing member coupled to the first and second portions to bias the upper segment of one of the first and second legs away from the lower segment of the other one of the first and second legs.

The support assembly may comprise first and second sets of the first and second legs. The first and second sets may be coupled to generally opposing front and rear sides of the heating assembly, respectively.

The apparatus may further comprise a tank support member connected between the lower segments of the first and second legs.

The tank support member may be releasably connected to the lower segments of at least one of the legs of each pair to permit movement of the support assembly between the upright and folded positions.

In another aspect of the present disclosure, there is a portable cooking apparatus, comprising a heating assembly, and a support assembly for supporting the heating assembly. The support assembly comprises front and rears sets of first and second legs. Each of the legs comprises an upper segment and a lower segment. In both sets, the first and second legs are pivotably coupled to each other generally between the upper and lower segments. In both sets, the upper segment of each of the first and second legs is pivotably coupled to the heating assembly. In both sets, the upper segment of at least one of the first and second legs is slidably coupled to the heating assembly and slides when the support assembly moves between upright and folded positions. In both sets, and in the folded position, the upper and lower segments of the first leg are adjacent to the lower and upper segments of the second leg, respectively. In both sets, and in each of the first and second legs, the upper and lower segments are laterally offset from one another so that, in the folded position, each of the lower segments is spaced apart from the heating assembly to accommodate the upper segment of the other leg in the respective set.

In another aspect of the present disclosure, there is a support assembly for supporting a heating assembly of a portable cooking apparatus. The support assembly comprises at least one set of first and second legs. Each of the first and second legs comprises an upper segment and a lower segment, and a pivot connector arranged generally between the upper and lower segments of the legs. The pivot connector comprises a first portion connecting a bottom end of the upper segment of the first leg with a top end of the lower segment of the first leg, a second portion connecting a bottom end of the upper segment of the second leg with a top end of the lower segment of the second leg, and a biasing member coupled to the first and second portions. The first and second portions are adapted to rotate relative to one another so that the legs are movable between an upright position and a folded position in which the upper and lower segments of the first leg are adjacent to the lower and upper segments of the second leg, respectively. The biasing member biases the upper segment of one of the first and second legs away from the lower segment of the other one of the first and second legs.

Other aspects and features of the teachings disclosed herein will become apparent, to those ordinarily skilled in the art, upon review of the following description of the specific examples of the specification.

BRIEF DESCRIPTION OF THE DRAWINGS

The drawings included herewith are for illustrating various examples of apparatuses and methods of the present disclosure and are not intended to limit the scope of what is taught in any way. In the drawings.

DETAILED DESCRIPTION

Various apparatuses or methods are described below to provide an example of an embodiment of each claimed invention. No embodiment described below limits any claimed invention and any claimed invention may cover apparatuses and methods that differ from those described below. The claimed inventions are not limited to apparatuses and methods having all of the features of any one apparatus or method described below or to features common to multiple or all of the apparatuses or methods described below. It is possible that an apparatus or method described below is not an embodiment of any claimed invention. Any invention disclosed in an apparatus or method described below that is not claimed in this document may be the subject matter of another protective instrument, and the applicant(s), inventor(s) and/or owner(s) do not intend to abandon, disclaim or dedicate to the public any such invention by its disclosure in this document.

Figure 1:
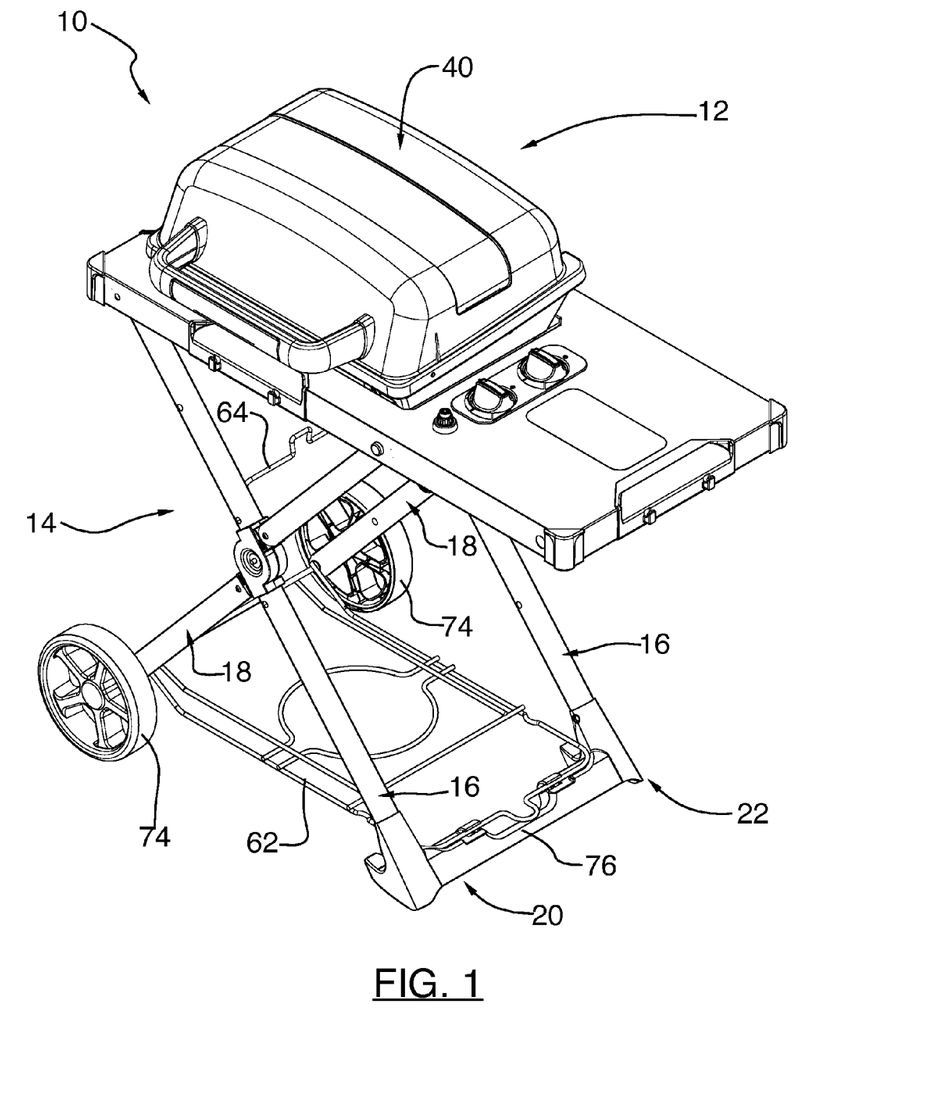
FIG. 1 is a perspective view of a portable cooking apparatus according to an example.
Figure 2:
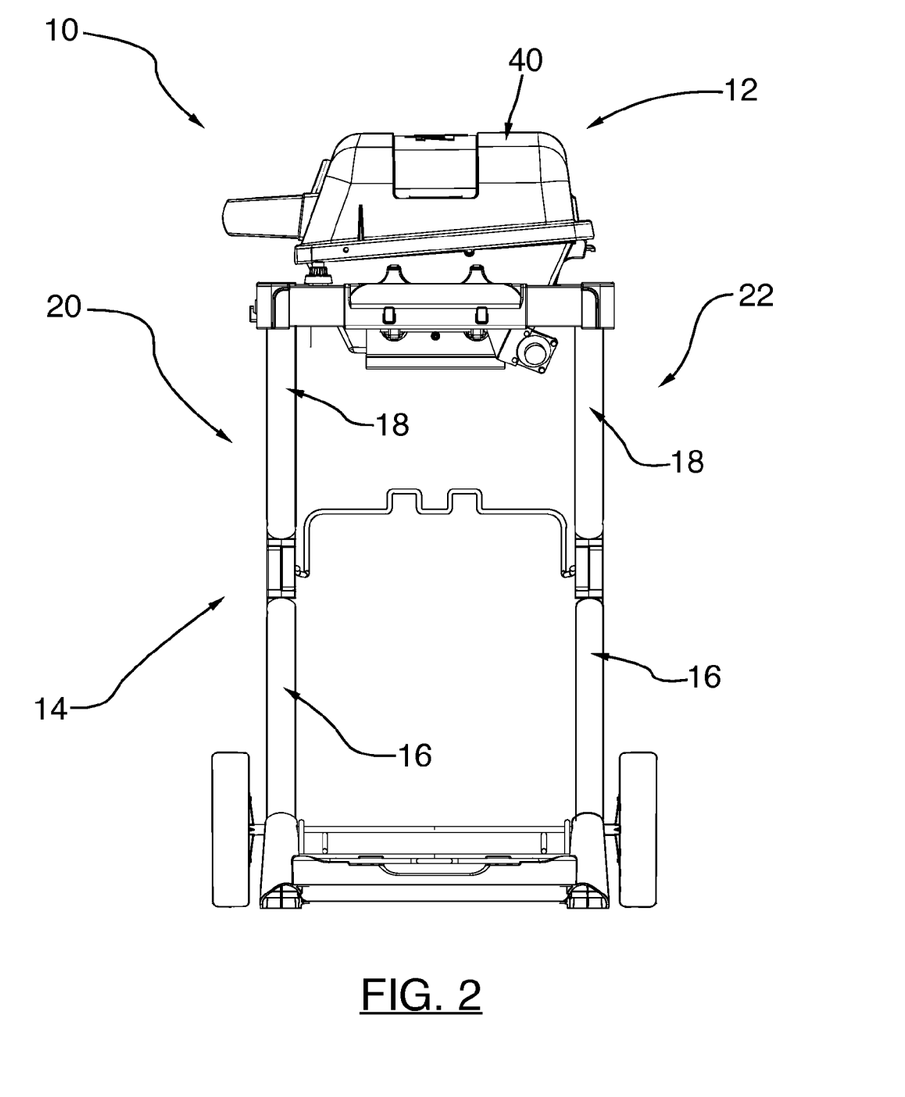
FIG. 2 is a side view of the portable cooking apparatus of FIG. 1.

Referring to FIGS. 1 and 2, a portable cooking apparatus is shown generally at reference numeral 10. The apparatus 10 includes a heating assembly 12. In the example illustrated, the heating assembly 12 includes an enclosure 40. A barbecue grill or burner assembly (not shown) may be arranged in the interior of the enclosure 40 to define a cooking chamber therewithin.

The apparatus 10 includes a support assembly 14 that supports the heating assembly 12 above the ground. The support assembly 14 includes a front set 20 of first and second legs 16, 18, which is oriented towards a front of the apparatus 10. In the example illustrated, the support assembly 14 further includes a rear set 22 of the first and second legs 16, 18, which is oriented towards a rear of the apparatus 10.

Figure 3:
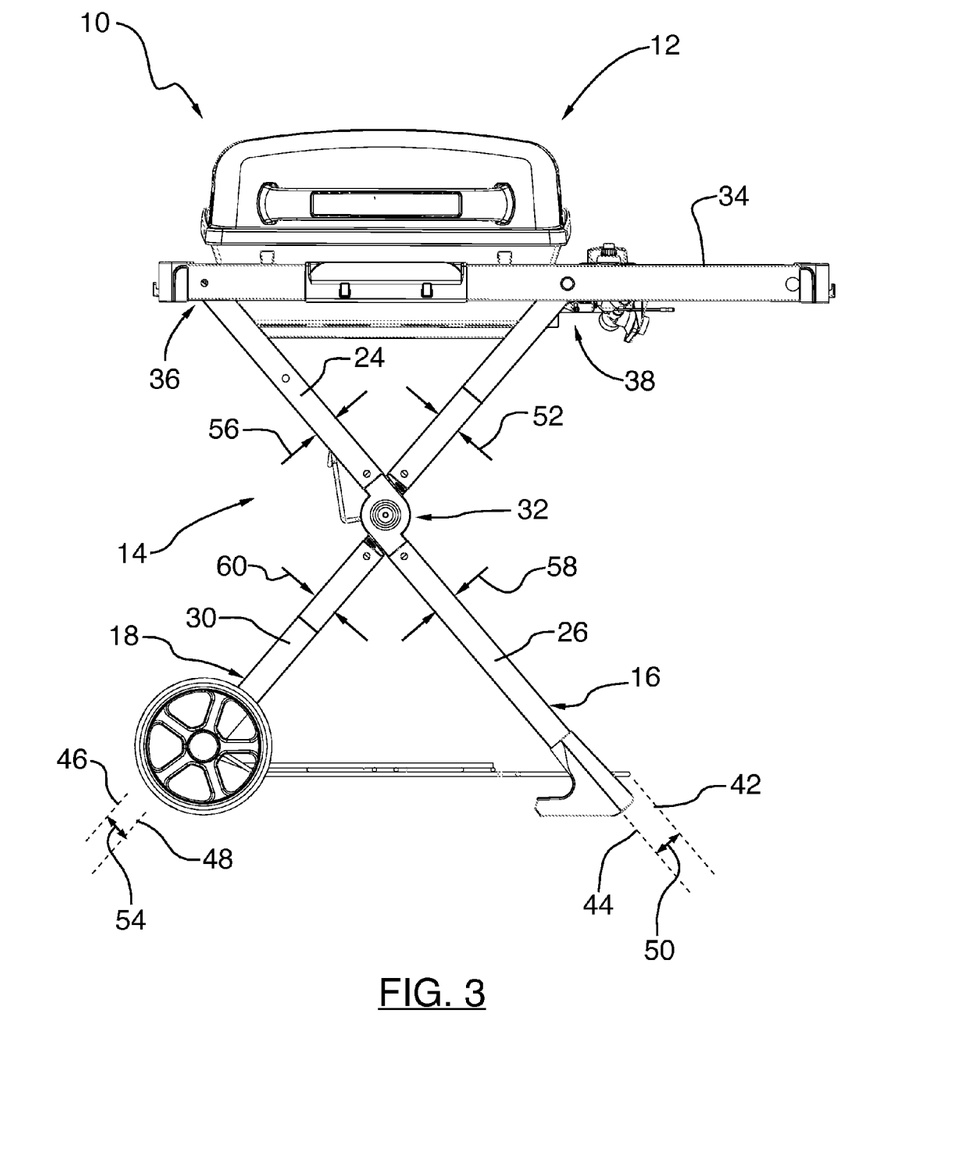
FIG. 3 is a front view of the portable cooking apparatus of FIG. 1, and in which a support assembly is shown in an upright position.

Referring now to FIG. 3, the first leg 16 may include an upper segment 24 and a lower segment 26, and the second leg 18 may include an upper segment 28 and a lower segment 30. The first and second legs 16, 18 may be pivotably coupled to each other generally between the upper and lower segments of each. In the example illustrated, the first and second legs 16, 18 intersect at a pivot connector 32. The pivot connector 32 is shown arranged between the upper and lower segments 24, 26 of the first leg 16 and the upper and lower segments 28, 30 of the second leg 18.

In the example illustrated, the heating assembly 12 includes a frame 34. The frame 34 may extend generally across the full width of the apparatus 10, at the front and the back of the apparatus 10. A top end 36 of the upper segment 24 of the first leg 16 may be pivotably coupled to the frame 34. A top end 38 of the upper segment 28 of the second leg 18 may be pivotably and slidably coupled to the frame 34, in a position spaced apart from the top end 36 of the upper segment 24 of the first leg 16.

Figure 4:
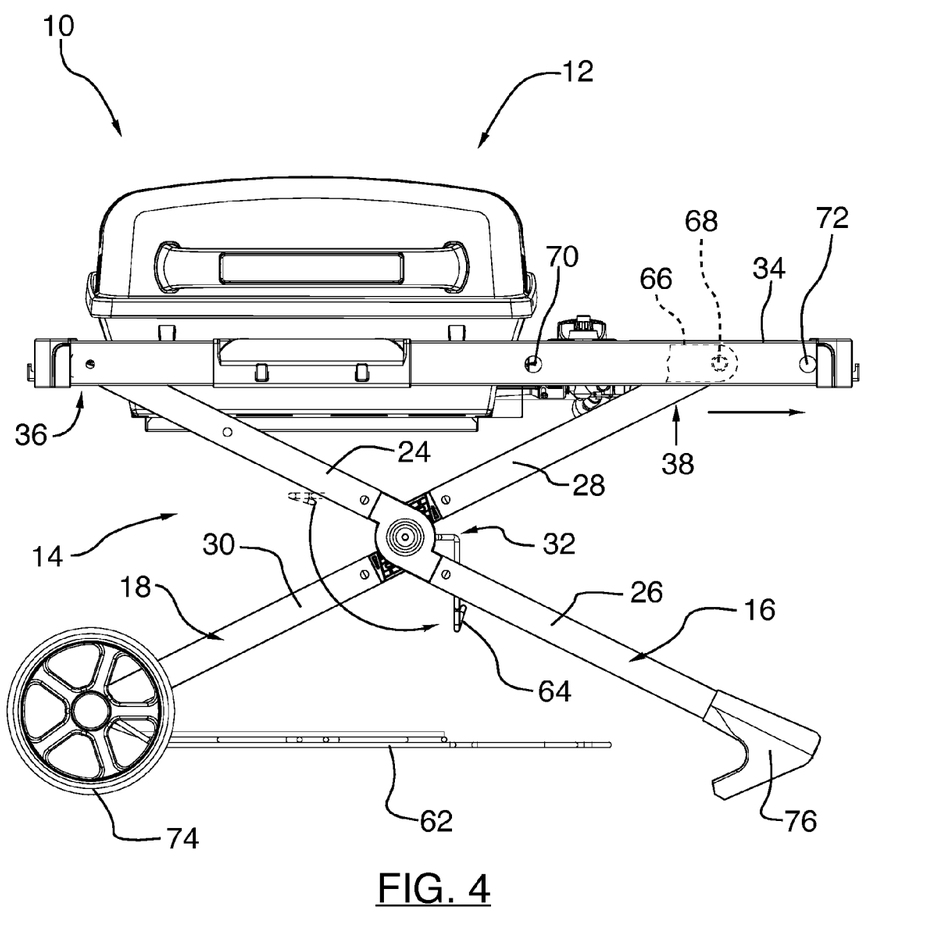
FIG. 4 is a front view of the portable cooking apparatus of FIG. 1, and in which the support assembly is shown in an intermediate position.
Figure 5:
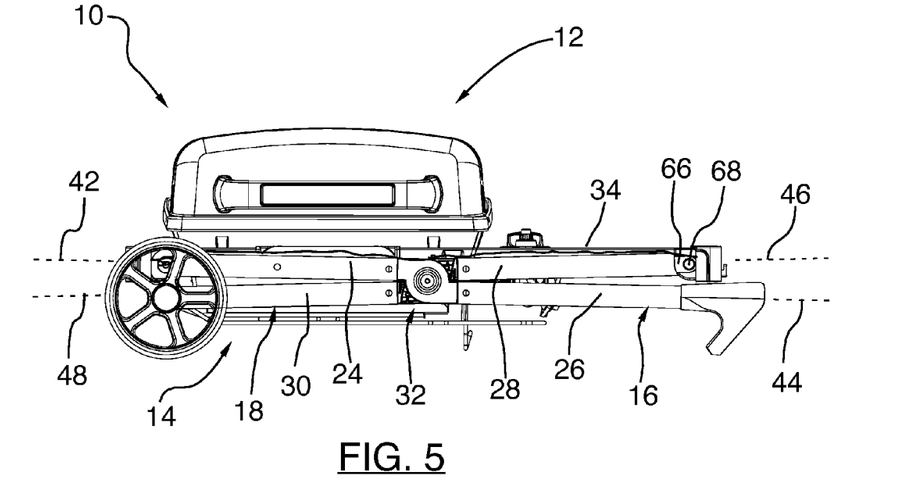
FIG. 5 is a front partial cutaway view of the portable cooking apparatus of FIG. 1, and in which the support assembly is shown in a folded position.

The support assembly 14 is movable between an upright position (FIG. 3) and a folded position (FIG. 5). FIG. 4 shows the support assembly 14 in an intermediate position between the upright and folded positions. In the example illustrated, the support assembly 14 moves between the upright position (FIG. 3) and the folded position (FIG. 5) by sliding the top end 38 of the upper segment 28 of the second leg 18 away from the top end 36 of the upper segment 24 of the first leg 16.

As shown in FIG. 5, when in the folded position, the upper and lower segments 24, 26 of the first leg 16 are adjacent to the lower and upper segments 30, 28 of the second leg 18, respectively. In the folded position, longitudinal axes 42, 46 of the upper segments 24, 28 may be arranged to be generally collinear, and longitudinal axes 44, 48 of the lower segments 26, 30 may be arranged to be generally collinear.

Referring again to FIG. 3, each of the segments of the legs 16, 18 may be generally elongate. The upper and lower segments of at least one of the legs 16, 18 may be laterally offset from one another. In the example illustrated, the upper and lower segment 24, 26 of the first leg 16 are laterally offset from one another, and the upper and lower segments 28, 30 of the second leg 18 are laterally offset from one another.

As shown in FIG. 5, when in the folded position, the lower segment 26 of the first leg 16 is spaced apart from the frame 34 to accommodate the upper segment 28 of the second leg 18. Similarly, the lower segment 30 of the second leg 18 is spaced apart from the frame 34 to accommodate the upper segment 24 of the first leg 16. Accordingly, when in the folded position, the support assembly 14 is collapsed into a relatively compact position.

Referring again to FIG. 3, the leg 16 may be configured so that the longitudinal axes 42, 44 of the segments 24, 26 are generally parallel. In the example illustrated, the longitudinal axis 42 of the upper segment 24 is spaced apart from the longitudinal axis 44 of the lower segment 26 by a first offset distance 50. The first offset distance 50 may be at least as large as a width dimension 52 of the upper segment 28 of the leg 18, so as to accommodate the upper segment 28 when the support assembly 14 is in the folded position.

Similarly, the leg 18 may be configured so that the longitudinal axes 46, 48 of the segments 28, 30 are generally parallel. In the example illustrated, the longitudinal axis 46 of the upper segment 28 is spaced apart from the longitudinal axis 48 of the lower segment 30 by a second offset distance 54. The second offset distance 54 may be at least as large as a width dimension 56 of the upper segment 24 of the leg 16, so as to accommodate the upper segment 28 when the support assembly 14 is in the folded position.

In some examples, the first offset distance 50 may be approximately equal to the width dimension 52, which may enable a relatively compact folded position. Similarly, the second offset distance 54 may be approximately equal to the width dimension 56. In the example illustrated, the offset distances 50, 54 are generally equal. Width dimensions 58, 60 of the lower segments 26, 30, respectively, may be similar but need not be exactly the same as that of the width dimensions 52, 56 of the upper segments 24, 28. It may simplify manufacturing if the segments 24, 26, 28, 30 are all formed of the same material having the same general dimensions.

Referring now to FIG. 4, the top end 38 of the upper segment 28 of the leg 18 may be pivotably fixed to a block 66. The block 66 is shown received in a channel of the frame 34, and is slidable relative to the frame 34. The top end 36 of the upper segment 24 of the leg 16 may also be pivotably fixed to a block (not shown), which, although it may not be slidable relative to the frame 34, it may otherwise be identical to the block 66 to simplify manufacturing.

A locking mechanism may be used so that a user may selectively fix a position of the block 66 relative to the frame 34. In the example illustrated, the block 66 includes a spring-loaded button 68. The frame 34 includes first and second holes 70, 72 positioned spaced apart from one another. The button 68 engages the holes 70, 72 to maintain the support assembly 14 in the upright position (FIG. 3) and the folded position (FIG. 5), respectively.

With reference to FIGS. 1 and 4, the apparatus 10 may further include at least one wheel 74. In the example illustrated, the apparatus 10 includes a foot element 76, which extends between the front and rear sets 20, 22. A tank support member 62 for supporting the bottom of a propane or other fuel container (not shown) may be fixed to the legs 18 of the front and rear sets 20, 22. In the upright position, the tank support member 62 may be releasably connected to the foot element 76 to permit movement of the support assembly between the upright and folded positions. The tank support member 62 may be released from the foot element 76 (FIG. 4) before moving the support assembly 14 to the folded position. Furthermore, a tank support member 64 for supporting the top of the fuel container may be rotated downwardly (FIG. 4) before moving before moving the support assembly 14 to the folded position.

In some examples, the first and second legs 16, 18 may be biased towards the upright position. In the example illustrated, referring again to FIG. 3, the first and second legs 16, 18 are shown intersecting at the pivot connector 32.

Figure 6:
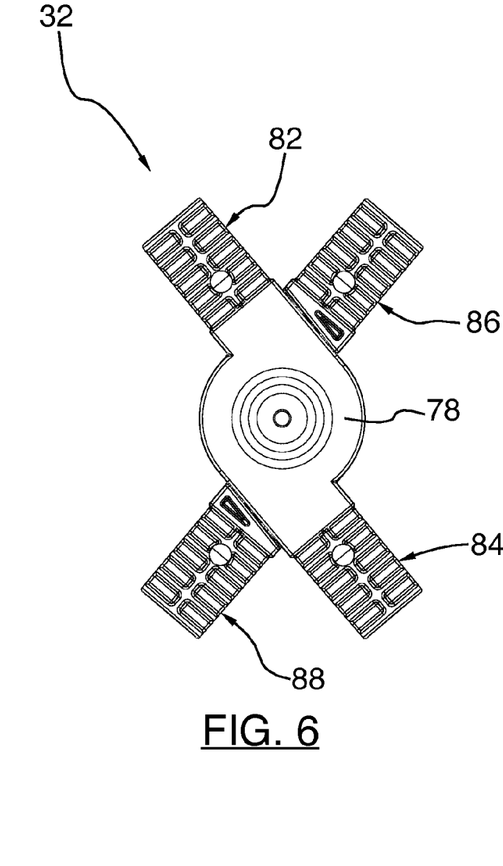
FIGS. 6 and 7 and front and side views, respectively, of a pivot connector of the portable cooking apparatus of FIG. 1.
Figure 7:
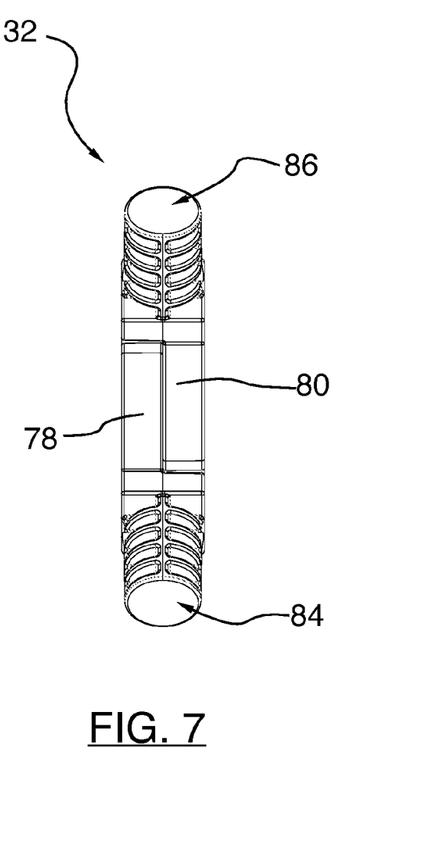

Referring now to FIGS. 6 and 7, the pivot connector 32 may include a first portion 78 and a second portion 80. In the example illustrated, the first portion 78 includes a connector 82 for connection to a bottom end of the upper segment 24, and a connector 84 on a generally opposing side from the connector 82 for connection to a top end of the lower segment 26. The second portion 80 includes a connector 86 for attachment to a bottom end of the upper segment 28, and a connector 88 on a generally opposing side from the connector 86 for attachment to a top end of the lower segment 30. Each of the connectors 82, 84, 86, 88 may be inserted into an end of its respective segment and fixed in place by friction fit and/or snap fit engagement.

Figure 8:
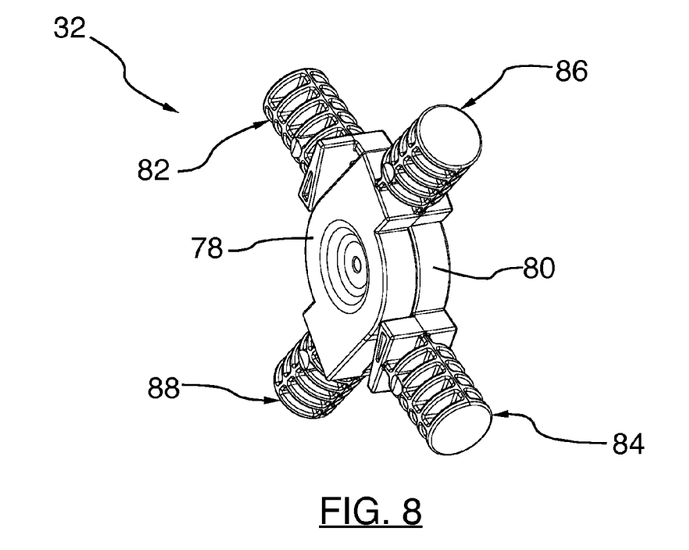
FIGS. 8 and 9 and perspective and exploded perspective views, respectively, of the pivot connector of FIGS. 6 and 7.
Figure 9:
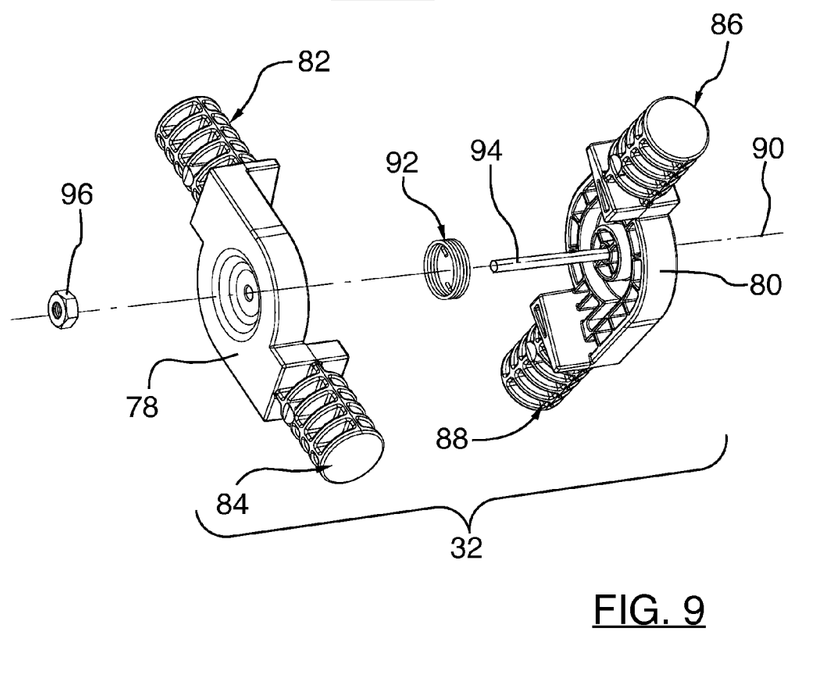

Referring now to FIGS. 8 and 9, the first and second portions 78, 80 may be configured to rotate relative to one another about a pivot axis 90. The pivot connector 32 further includes a biasing member 92 coupled between the first and second portions 78, 80 to bias the legs to the upright position. The biasing member 92 may be a spring. A shaft 94 is secured to the second portion 80, and a nut 96 is fixed to the shaft 94 to couple the first portion 78 to the second portion 80.

While the above description provides examples of one or more apparatuses or methods, it will be appreciated that other apparatuses or methods may be within the scope of the accompanying claims.

We claim:
1. A portable cooking apparatus, comprising:
a heating assembly; and
a support assembly for supporting the heating assembly, the support assembly comprising at least one set of first and second legs, each of the first and second legs comprising an upper segment and a lower segment,
wherein the first and second legs are pivotably coupled to each other generally between the upper and lower segments, wherein the upper segment of each of the first and second legs is pivotably coupled to the heating assembly, wherein the upper segment of at least one of the first and second legs is slidably coupled to the heating assembly and slides when the support assembly moves between upright and folded positions, wherein, in the folded position, the upper segment of the first leg is adjacent to the lower segment of the second leg and the upper segment of the second leg is adjacent to the lower segment of the first leg, and wherein, in at least one of the first and second legs, the upper and lower segments are laterally offset from one another.

2. The apparatus of claim 1, wherein, in the folded position, the lower segment of the at least one of the first and second legs is spaced apart from the heating assembly to accommodate the upper segment of the other one of the first and second legs.

3. The apparatus of claim 2, wherein in the at least one of the first and second legs, longitudinal axes of the upper and lower segments are generally parallel.

4. The apparatus of claim 3, wherein the longitudinal axis of the upper segment of the first leg is spaced apart from the longitudinal axis of the lower segment by an offset distance, and the offset distance is at least as large as a width dimension of the upper segment of the second leg.

5. The apparatus of claim 3, wherein the longitudinal axis of the upper segment of the first leg is spaced apart from the longitudinal axis of the lower segment by an offset distance, and the offset distance is approximately equal to a width dimension of the upper segment of the second leg.

6. The apparatus of claim 1, wherein, in each of the first and second legs, the upper and lower segments are laterally offset from one another so that, in the folded position, each of the lower segments is spaced apart from the heating assembly by the upper segments to accommodate the upper segment of the other leg.

7. The apparatus of claim 6, wherein, in each of the first and second legs, longitudinal axes of the upper and lower segments are generally parallel.

8. The apparatus of claim 7, wherein:
in the first leg, the longitudinal axis of the upper segment is spaced apart from the longitudinal axis of the lower segment by a first offset distance;
in the second leg, the longitudinal axis of the upper segment is spaced apart from the longitudinal axis of the lower segment by a second offset distance; and
the first and second offset distances are at least as large as width dimensions of the upper segments of the second and first legs, respectively.

9. The apparatus of claim 7, wherein:
in the first leg, the longitudinal axis of the upper segment is spaced apart from the longitudinal axis of the lower segment by a first offset distance;
in the second leg, the longitudinal axis of the upper segment is spaced apart from the longitudinal axis of the lower segment by a second offset distance; and
the first and second offset distances are approximately equal to width dimensions of the upper segments of the second and first legs, respectively.

10. The apparatus of claim 9, wherein the first and second offset dimensions are generally equal.

11. The apparatus of claim 1, wherein the heating assembly comprises a frame, and a top end of the upper segment of the first leg is pivotably connected to the frame towards a first side thereof, and a top end of the upper segment of the second leg is pivotably fixed to a block, and the block is slidably received in a channel of the frame.

12. The apparatus of claim 11, further comprising a locking mechanism for fixing a location of the block relative to the channel when the support assembly is in at least one of the upright and folded positions.

13. The apparatus of claim 1, wherein the first and second legs intersect at a pivot connector arranged between the upper and lower segments of each of the first and second legs, the pivot connector comprising a first portion connecting a bottom end of the upper segment of the first leg with a top end of the lower segment of the first leg, and a second portion connecting a bottom end of the upper segment of the second leg with a top end of the lower segment of the second leg, the first and second portions being adapted to rotate relative to one another about a pivot axis.

14. The apparatus of claim 13, wherein the pivot connector comprises a biasing member coupled to the first and second portions to urge the upper segment of one of the first and second legs away from the lower segment of the other one of the first and second legs.

15. The apparatus of claim 1, wherein the support assembly comprises first and second sets of the first and second legs, the first and second sets being coupled to generally opposing front and rear sides of the heating assembly, respectively.

16. The apparatus of claim 15, further comprising a tank support member connected between the lower segments of the first and second legs.

17. The apparatus of claim 16, wherein the tank support member is releasably connected to the lower segments of at least one of the legs of each pair to permit movement of the support assembly between the upright and folded positions.

18. A portable cooking apparatus, comprising:
a heating assembly; and
a support assembly for supporting the heating assembly, the support assembly comprising front and rear sets of first and second legs, each of the legs comprising an upper segment and a lower segment,
wherein, in both sets, the first and second legs are pivotably coupled to each other generally between the upper and lower segments,
wherein, in both sets, the upper segment of each of the first and second legs is pivotably coupled to the heating assembly,
wherein, in both sets, the upper segment of at least one of the first and second legs is slidably coupled to the heating assembly and slides when the support assembly moves between upright and folded positions,
wherein, in both sets, and in the folded position, the upper segment of the first leg is adjacent to the lower segment of the second leg and the upper segment of the second leg is adjacent to the lower segment of the first leg, and
wherein, in both sets, and in each of the first and second legs, the upper and lower segments are laterally offset from one another so that, in the folded position, each of the lower segments is spaced apart by the upper segments from the heating assembly to accommodate the upper segment of the other leg in the respective set.

19. A portable cooking apparatus, comprising:
a heating assembly; and
a support assembly for supporting the heating assembly of a portable cooking apparatus, the support assembly comprising:
at least one set of first and second legs, each of the first and second legs comprising an upper segment and a lower segment; and a pivot connector arranged generally between the upper and lower segments of the legs, the pivot connector comprising a first portion connecting a bottom end of the upper segment of the first leg with a top end of the lower segment of the first leg, a second portion connecting a bottom end of the upper segment of the second leg with a top end of the lower segment of the second leg, and a biasing member coupled to the first and second portions, wherein the first and second portions are adapted to rotate relative to one another so that the legs are movable between an upright position and a folded position in which the upper and lower segments of the first leg are adjacent to the lower and upper segments of the second leg, respectively, and wherein, in the folded position, the biasing member urges the legs towards the upright position.

* * * * *